US012763464B2

(12) United States Patent
Fabrega Sanchez et al.

(10) Patent No.: US 12,763,464 B2
(45) Date of Patent: Oct. 13, 2026

(54) GLASS ASSEMBLY WITH RADIO-FREQUENCY LENS

(71) Applicant: QUALCOMM Incorporated, San Diego, CA (US)

(72) Inventors: Jorge Fabrega Sanchez, San Diego, CA (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 18/470,648

(22) Filed: Sep. 20, 2023

(65) Prior Publication Data

US 2025/0096464 A1 Mar. 20, 2025

(51) Int. Cl.

*H01Q 3/00* (2006.01)
*B32B 17/10* (2006.01)
*H01Q 3/46* (2006.01)

(52) U.S. Cl.

CPC ......... *H01Q 3/46* (2013.01); *B32B 17/10045* (2013.01); *B32B 17/10201* (2013.01); *B32B 17/1044* (2013.01); *B32B 17/10761* (2013.01); *B32B 2605/00* (2013.01)

(58) Field of Classification Search

CPC ...... H01Q 3/46; H01Q 1/3291; H01Q 1/1271; H01Q 15/10; H01Q 19/062; H01Q 3/24; B32B 17/10045; B32B 17/10201; B32B 17/1044; B32B 17/10761; B32B 2605/00

See application file for complete search history.

(56) References Cited

U.S. PATENT DOCUMENTS

2014/0015716 A1* 1/2014 Villarroel ................. H01Q 9/42 343/713
2015/0380816 A1* 12/2015 Tajika ................... H04W 24/02 370/315
2016/0006112 A1* 1/2016 Kagaya .................... H01Q 9/16 343/712
2018/0316090 A1* 11/2018 Foo ...................... H01Q 15/002
2018/0316365 A1* 11/2018 Völkel ................ H01Q 15/0013
2019/0067826 A1* 2/2019 Achour ................ H01Q 21/065
2019/0123421 A1 4/2019 Appold et al.

(Continued)

FOREIGN PATENT DOCUMENTS

CN 102778705 B 7/2015
CN 112310648 A * 2/2021 ........... H01Q 1/1271
GB 2602991 A * 7/2022 ............. H01Q 1/364

OTHER PUBLICATIONS

Liu ("Low Scan Loss Bifocal Ka-band Transparent Transmitarray Antenna", 2018 IEEE international Symposium on Antennas and Propagation & amp; USNC/URSI National Radio Science Meeting, IEEE, Jul. 8, 2018, pp. 1449-1450, XP033497094, chapters I-III, figures 1-3) (Year: 2018).*

(Continued)

*Primary Examiner* — Ping Y Hsieh

(74) *Attorney, Agent, or Firm* — Smith Tempel Blaha LLC / Qualcomm

(57) ABSTRACT

A window assembly includes a window and an array of lens elements disposed on or in the window. Each lens element of the array of lens elements is optically transparent and electrically conductive. The array of lens elements is configured to impart a plurality of phase shifts to an incident radio-frequency (RF) wave.

23 Claims, 13 Drawing Sheets

(56) References Cited

U.S. PATENT DOCUMENTS

| | | | |
|---|---|---|---|
| 2021/0175628 | A1 | 6/2021 | Dai |
| 2021/0215819 | A1 | 7/2021 | Uchida et al. |

OTHER PUBLICATIONS

Kosuga S., et al., “Optically Transparent Antenna Based on Carrier-doped Three-layer Stacked Graphene”, AIP Advances 11, Published Online Mar. 22, 2021, pp. 1-7.

Zhang H., et al., “Research on Automotive Windshield Impact on the W-band Millimeter-wave Transmission”, IEEE, 2015 Asia-Pacific Microwave Conference (APMC), Dec. 6-9, 2015, 3 pages.

International Search Report and Written Opinion—PCT/US2024/043406—ISA/EPO—Feb. 3, 2025.

Liu G., et a., “Low Scan Loss Bifocal Ka-band Transparent Transmitarray Antenna”, 2018 IEEE International Symposium on Antennas and Propagation & USNC/URSI National Radio Science Meeting, IEEE, Jul. 8, 2018, pp. 1449-1450, XP033497094, chapters I-III, figures 1-3.

Partial International Search Report—PCT/US2024/043406—ISA/EPO—Dec. 12, 2024.

* cited by examiner

GLASS ASSEMBLY WITH RADIO-FREQUENCY LENS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

A wireless device (e.g., a cellular phone or a smart phone) may include a transmitter and a receiver coupled to an antenna to support two-way communication. The antenna may be enclosed within a housing assembly (e.g., cover) based on portability and aesthetics design considerations. In general, the transmitter may modulate a radio-frequency (RF) carrier signal with data to produce a modulated signal, amplify the modulated signal to produce an output RF signal having the proper power level, and transmit the output RF signal via the antenna to a base station. For data reception, the receiver may obtain a received RF signal via the antenna and may condition and process the received RF signal to recover data sent by a base station or other entity. To facilitate and/or enable wireless signal applications, numerous types of antennas have been developed, with different antennas used based on the needs of an application, e.g., distance, frequency, operational frequency bandwidth, antenna pattern beam width, gain, beam steering, etc. Newer RF technologies and wireless devices are becoming more reliant on dual-band performance.

Wireless devices have been provided on-board vehicles to provide for vehicle-based communications. These wireless devices have incorporated certain of the features and functions described above.

SUMMARY

An example window assembly includes a window and an array of lens elements disposed in the window, wherein each lens element of the array of lens elements is optically transparent and electrically conductive, the array of lens elements being configured to impart a plurality of phase shifts to an incident radio-frequency (RF) wave.

DETAILED DESCRIPTION

As used herein including in the claims, the following terms will have the following specified meanings, unless the context requires otherwise:

a. “Transparent conductor” includes transparent semiconductor.

b. “Electrically conductive” includes electrically semiconductive.

c. “Transparent” means allowing the passage of at least a portion of a specified form of radiation.

d. “Arranged concentrically,” “situated concentrically,” “concentric,” and the like refer to sharing a common geometric center or a common focus.

Assemblies, systems, and techniques are disclosed herein for facilitating wireless signal transfer through a glass assembly. For example, wireless signals may be transferred to and/or from a vehicle, e.g., wireless communications to and/or from a wireless device through a window. For example, an RF lens may be embedded in glass, such as automotive glass, and may be formed of a transparent semiconductor. The lens can receive RF radiation, e.g., from a source outside the glass (e.g., a mmWave signal source such as a cell phone on an automobile dashboard or an on-board RF antenna in an auto dashboard, etc.). Example lenses need not have varying thickness or a curved lens surface to produce a lensing effect upon received RF radiation. Instead, example window assemblies may produce refraction using a spatially varying phase shift, which may enable example lenses to be flat. More particularly, an example lens may comprise an array of lens elements. Different lens elements of the lens may comprise different sizes of translucent conductive patches that induce different phase shifts to the received RF radiation. Example implementations using the lens can be used in a vehicle to support RF communications, such as mmWave wireless communications, including 5G communications. While the discussion herein often focuses on vehicle windows, and windshields (i.e., front windows of vehicles) in particular, techniques and apparatus discussed herein may be used in other contexts, e.g., other windows (for example in a building), non-window assemblies, etc.

Items and/or techniques described herein may provide one or more of the following capabilities, as well as other capabilities not mentioned. High-gain, directional RF radiation may be provided. Impedance matching may be provided that may enhance antenna performance, e.g., increase gain and/or increase return loss. Other capabilities may be provided and not every implementation according to the disclosure must provide any, let alone all, of the capabilities discussed.

Figure 1:
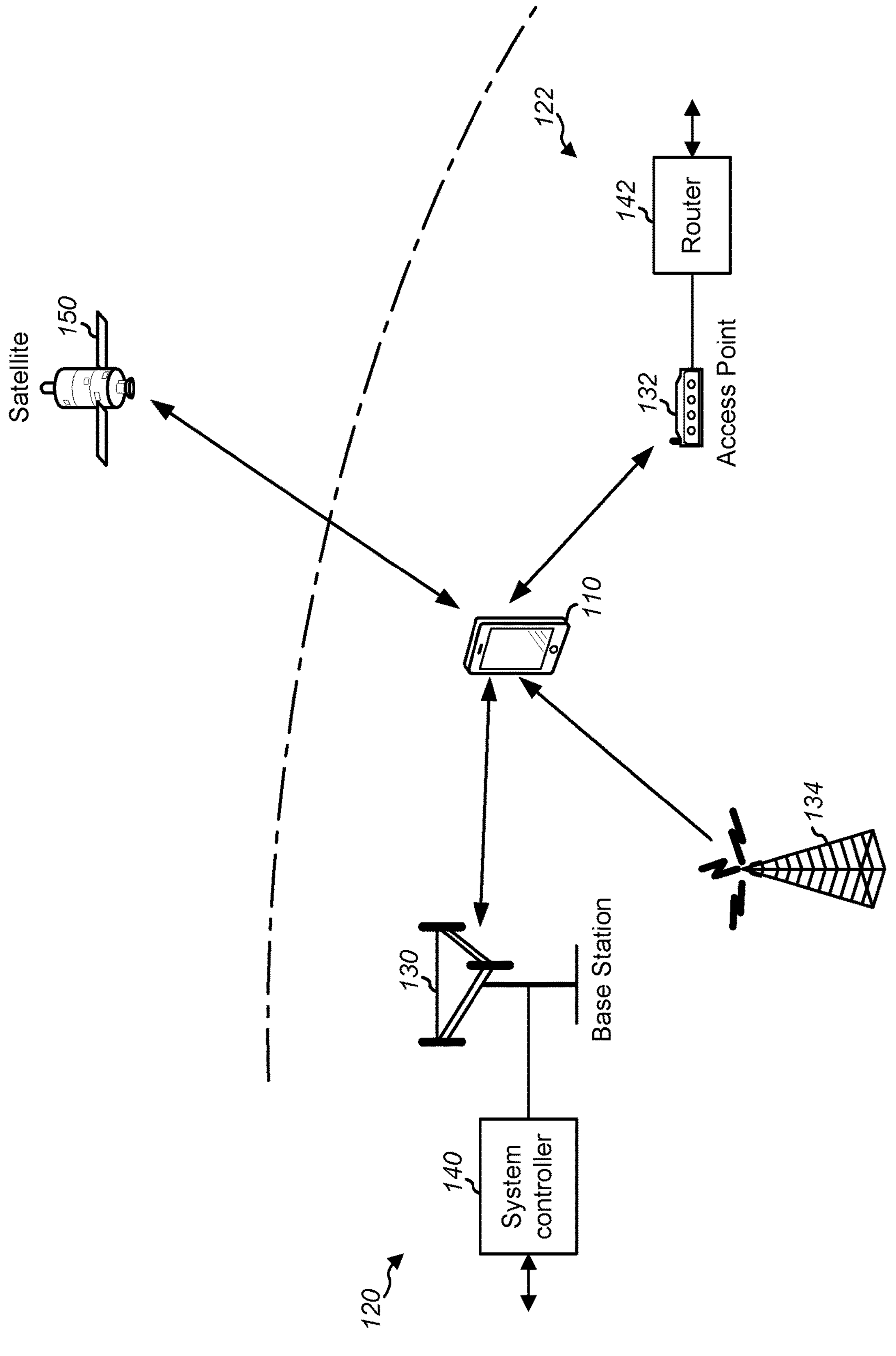
FIG. 1 is a schematic diagram of a wireless communication and/or positioning system.

Referring to FIG. 1, a wireless device 110 capable of communicating with different wireless communication systems 120 and 122 is shown. The wireless system 120 may be a Code Division Multiple Access (CDMA) system (which may implement Wideband CDMA (WCDMA), cdma2000, or some other version of CDMA), a Global System for Mobile Communications (GSM) system, a Long Term Evolution (LTE) system, a 5G system, etc. The wireless system 122 may be a wireless local area network (WLAN) system, which may implement IEEE 802.11, etc. For simplicity, FIG. 1 shows the wireless system 120 including a base station 130 and a system controller 140, and the wireless system 122 including an access point 132 and a router 142. In general, each system may include any number of stations and any set of network entities.

The wireless device 110 may also be referred to as a user equipment (UE), a mobile device, a mobile station, a terminal, an access terminal, a subscriber unit, a station, etc. The wireless device 110 may be a cellular phone, a smart phone, a tablet, a wireless modem, a personal digital assistant (PDA), a handheld device, a laptop computer, a smart book, a netbook, a cordless phone, a wireless local loop (WLL) station, an internet of things (IoT) device, a medical device, a device in an automobile, a consumer premises equipment (CPE), a Bluetooth device, etc. The wireless device 110 may be equipped with any number of antennas. Multiple antennas may be used to provide better performance, to simultaneously support multiple services (e.g., voice and data), to provide diversity against deleterious path effects (e.g., fading, multipath, and interference), to support multiple-input multiple-output (MIMO) transmission to increase data rate, and/or to obtain other benefits. The wireless device 110 may be capable of communicating with one or more wireless systems 120 and/or 122. The wireless device 110 may also be capable of receiving signals from broadcast stations (e.g., a broadcast station 134). The wireless device 110 may also be capable of communicating with satellites (e.g., a satellite 150), for example receiving signals in one or more global navigation satellite systems (GNSS) and/or transmitting signals to satellites in other systems. Further, the wireless device 110 may be configured to communicate directly with other wireless devices (not illustrated), e.g., without relaying communications through a base station or access point or other network device.

In general, the wireless device 110 may support communication with any number of wireless systems, which may employ any radio technologies such as WCDMA, cdma2000, LTE, 5G, GSM, 802.11, GPS, etc. The wireless device 110 may also support operation on any number of frequency bands.

The wireless device 110 may support operation at a very high frequency, e.g., within millimeter-wave (MMW) frequencies from 24 to 300 gigahertz (GHz) or higher. For example, the wireless device 110 may be capable to operate with dual bands. One such configuration includes the 28 GHz and 39 GHz bands. Other very high frequency (e.g., 5G) bands, such as 60 GHz or higher frequency bands, may also be realized with the wireless device 110 and implemented as one of the dual bands. In other examples, the wireless device 110 supports operation within the FR3 range of frequencies, for example from approximately 7 GHz to approximately 24 GHz. The wireless device 110 may include an antenna system to support CA operations at MMW frequencies. The antenna system may include a number of antenna elements, with each antenna element being used to transmit and/or receive signals. The terms "antenna" and "antenna element" are used interchangeably herein. Generally, each set of antenna elements may be implemented with a patch antenna or a strip-shaped radiator. A suitable antenna type may be selected for use based on the operating frequency of the wireless device, the desired performance, etc. In an exemplary design, an antenna system may include a number of patch and/or strip-type antennas supporting operation at MMW frequencies.

The wireless communication environments illustrated in FIG. 1 can also be utilized by the wireless device 110 for determination of location, object detection, and collision avoidance. These functions can be particularly useful when the wireless device 110 is in a vehicle, such as in the form of a cell phone being carried in the vehicle or an on-board vehicle communication system. The window assemblies and related systems and methods described hereinafter can improve wireless communications to and from a vehicle and also in other environments in which a window or other glass assembly may be present. Example types of such wireless communications that may be improved include the types of communications described in connection with FIG. 1.

Figure 2A:
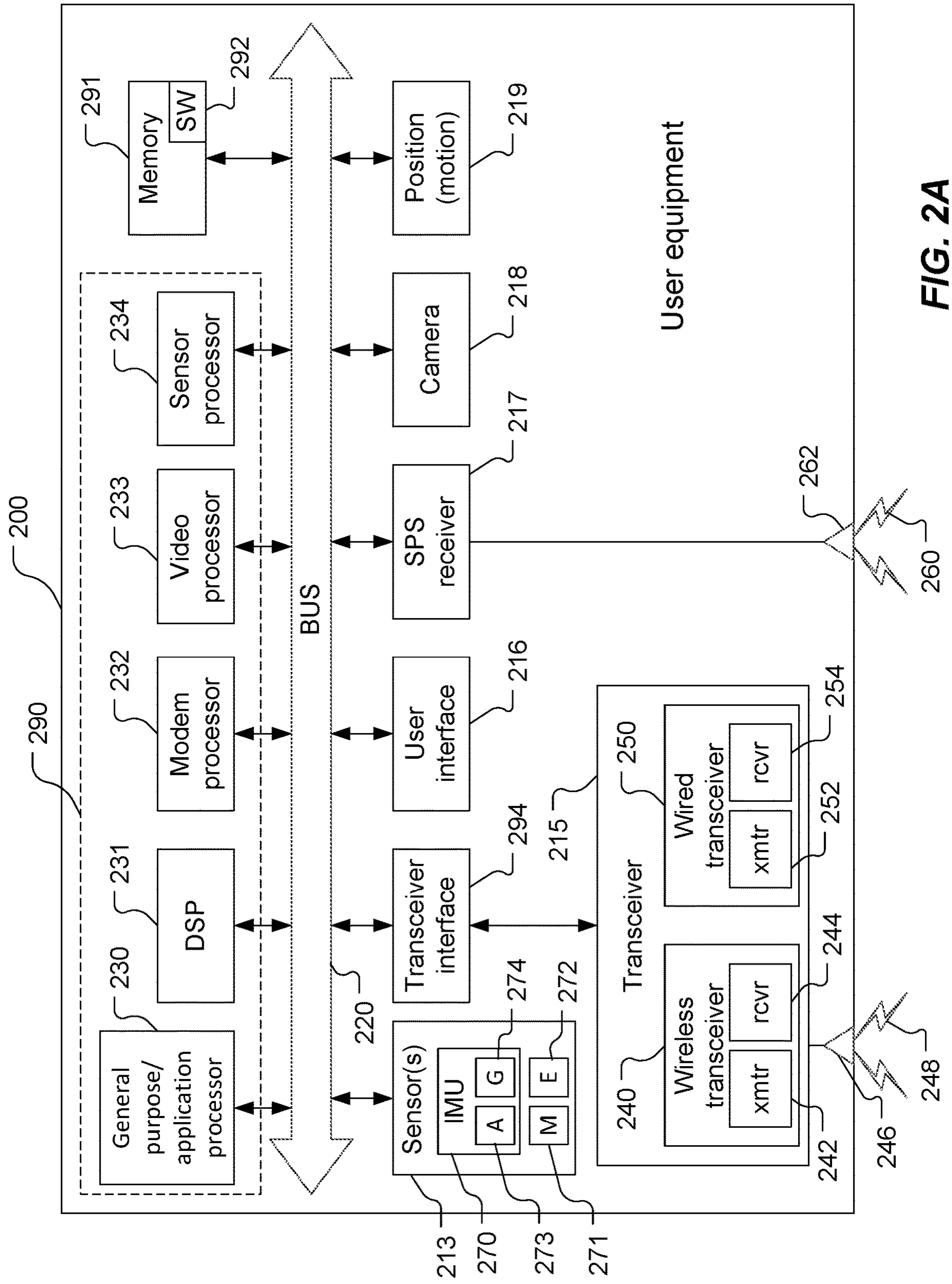
FIG. 2A is a block diagram of components of an example user equipment shown in FIG. 1.

Referring also to FIG. 2A, a UE 200 may be an example of the UE 110 and may comprise a computing platform including a processor 290, memory 291 including software (SW) 292, one or more sensors 213, a transceiver interface 294 for a transceiver 215 (that includes a wireless transceiver 240 and a wired transceiver 250), a user interface 216, a Satellite Positioning System (SPS) receiver 217, a camera 218, and a position device (PD) 219. The processor 290, the memory 291, the sensor(s) 213, the transceiver interface 294, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 290 may include one or more hardware devices, e.g., a central processing unit (CPU), a microcontroller, an application specific integrated circuit (ASIC), etc. The processor 290 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 291 may be a non-transitory storage medium that may include random access memory (RAM), flash memory, disc memory, and/or read-only memory (ROM), etc. The memory 291 may store the software 292 which may be processor-readable, processor-executable software code containing instructions that may be configured to, when executed, cause the processor 290 to perform various functions described herein. Alternatively, the software 292 may not be directly executable by the processor 290 but may be configured to cause the processor 290, e.g., when compiled and executed, to perform the functions. The description herein may refer to the processor 290 performing a function, but this includes other implementations such as where the processor 290 executes software and/or firmware. The description herein may refer to the processor 290 performing a function as shorthand for one or more of the processors 230-234 performing the function. The description herein may refer to the UE 200 performing a function as shorthand for one or more appropriate components of the UE 200 performing the function. The processor 290 may include a memory with stored instructions in addition to and/or instead of the memory 291. Functionality of the processor 290 is discussed more fully below.

The configuration of the UE 200 shown in FIG. 2A is an example and not limiting of the disclosure, including the claims, and other configurations may be used. For example, an example configuration of the UE may include one or more of the processors 230-234 of the processor 290, the memory 291, and the wireless transceiver 240. Other example configurations may include one or more of the processors 230-234 of the processor 290, the memory 291, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 291 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to a network or other device/controller (e.g., in a vehicle) regarding the mobility of the UE 200. For example, based on the information obtained/measured by the sensor(s) 213, the UE 200 may notify/report that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 290.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The antenna 246 may be configured as described with respect to the examples below (e.g., in an RF transfer device situation adjacent a glass assembly). The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), satellite, Bluetooth®, Zigbee®, etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 294, e.g., by optical and/or electrical connection. The transceiver interface 294 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 291 to be processed by DSP 231 and/or the general-purpose/application processor 230 in response to action from a user. Similarly, applications hosted on the UE 200 may store indications of analog and/or digital signals in the memory 291 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 291, the DSP 231 and/or one or more specialized processors (not shown) may be utilized to process acquired SPS signals, in whole or in part, and/or to calculate an estimated location of the UE 200, in conjunction with the SPS receiver 217. The memory 291 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 291 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 290 and the memory 291 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 290 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 2B:
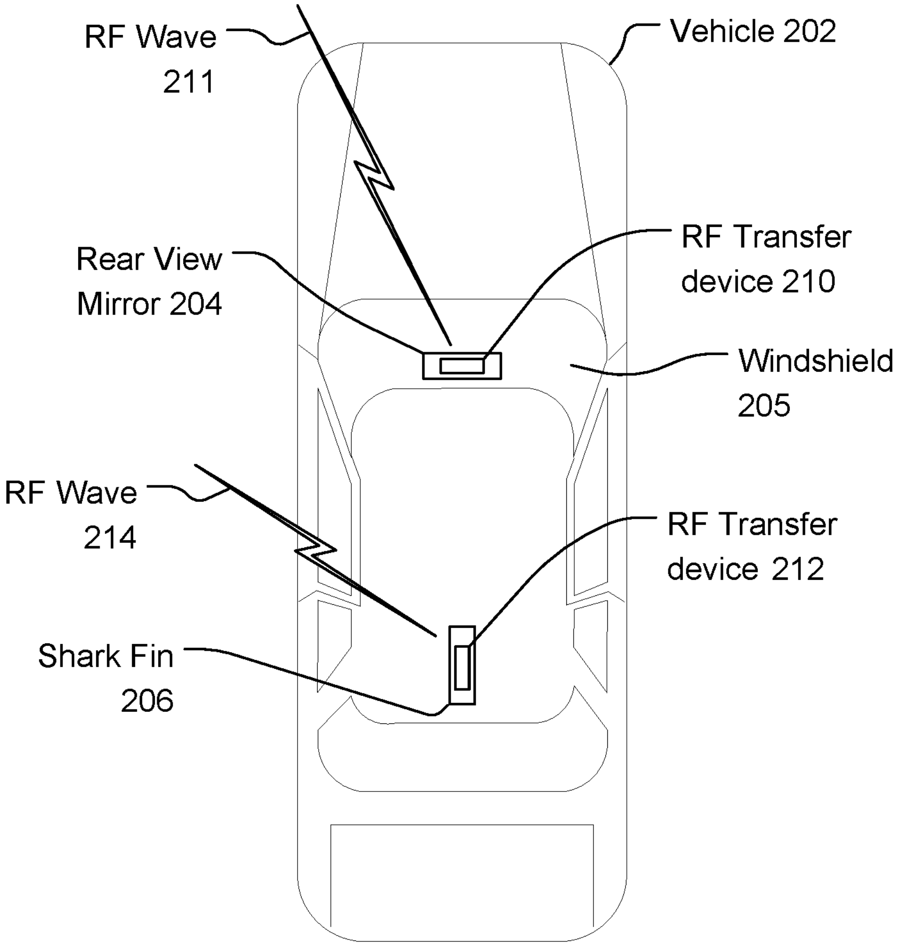
FIG. 2B Prior Art
FIG. 2B is a top-view diagram illustrating a vehicle with existing on-board radio-frequency (RF) communications components.

Referring to FIG. 2B, a top-view diagram illustrating a vehicle 202 with on-board radio-frequency (RF) components is shown. The vehicle 202 has a rear view mirror 204 attached to a windshield 205. Implemented in the rear view mirror 204 is an RF transfer device 210 that can transmit and/or receive RF waves 211 (e.g., RF signals). In addition, or alternatively, the vehicle 202 can have a shark fin 206 implemented on top of the vehicle 202. The shark fin 206 houses therein an RF transfer device 212, which can perform communications by transmitting and receiving RF waves 214.

The RF transfer devices 210, 212 can be mmWave and/or FR3 5G systems, for example. Implementations of the RF transfer devices 210, 212 outside of a body of the vehicle 202 in the shark fin 206 or adjacent to the windshield 205 in the rear view mirror 204 may help to overcome a shielding effect of a chassis of the vehicle 202. The vehicle 202 may, however, use costly long cables, which have signal losses, in order to reach antennas of the RF transfer devices 210, 212, e.g., from a dashboard of the vehicle 202. Apparatus discussed herein, such as a mmWave or FR3 patch antenna array, may be used to transmit and/or receive RF waves from and/or to an interior of a vehicle without a need for such lengthy cables. Also or alternatively, apparatus discussed herein may be able to alter (e.g., focus) and/or beam steer RF waves, e.g., to enhance signal strength in transmission and/or reception of RF signals.

Figure 3B:
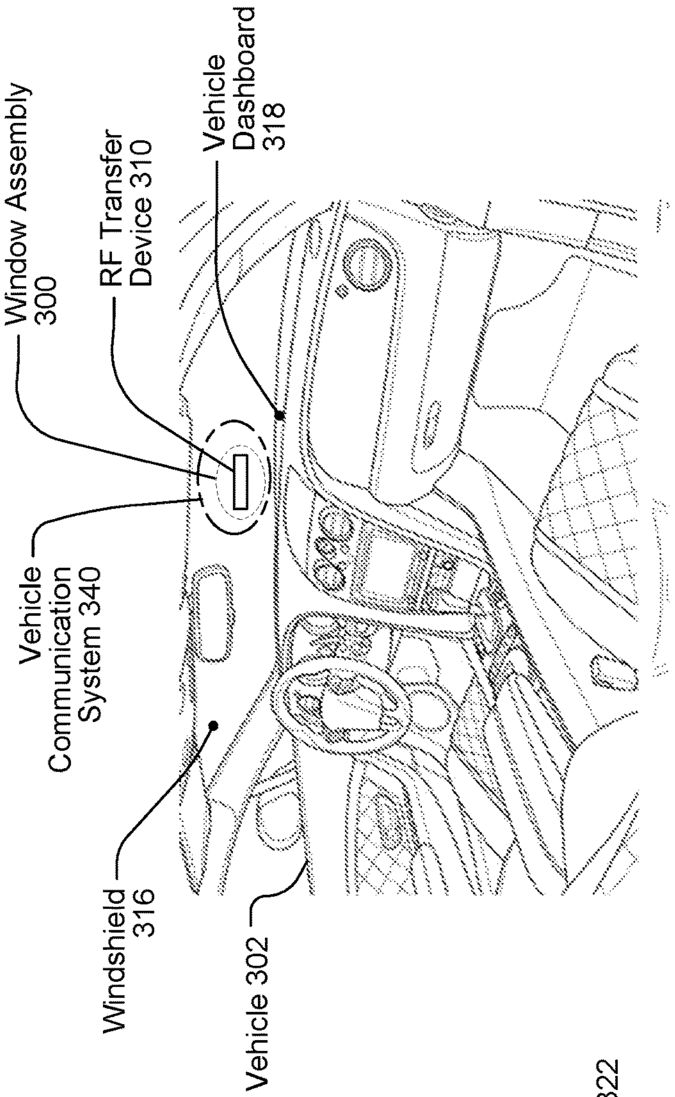
FIG. 3B is an illustration of an interior of a vehicle including the example vehicle communication system of FIG. 3A.
Figure 3A:
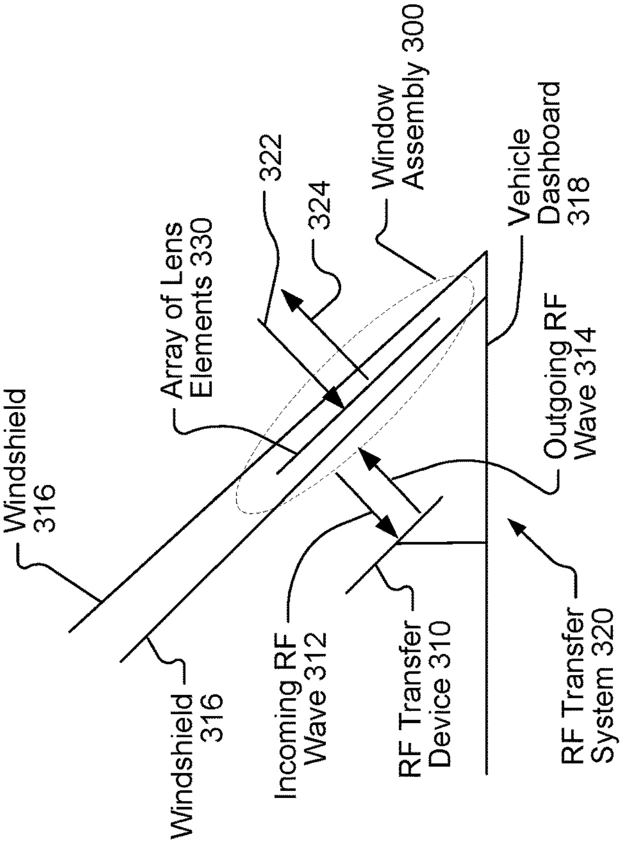
FIG. 3A is an edge-view of an example window assembly with an array of lens elements disposed therein, working with an RF transfer device as part of an example vehicle communication system.

Referring to FIG. 3A, with further reference to FIGS. 1-2, an edge-view (here, a side view) illustration of an example window assembly 300 is shown. The window assembly 300 is illustrated functioning together with an RF transfer device 310 as part of an example RF transfer system 320, e.g., here a vehicle communication system. A windshield 316 of a vehicle (an example of a window), positioned adjacent to a vehicle dashboard 318, includes an array of lens elements 330 disposed therein. The window assembly includes the windshield 316 and the array of lens elements 330. The RF transfer device 310, such as a mmWave or FR3 transfer device, can be placed in the vehicle within or on the dashboard 318, with antennas in the RF transfer device 310 configured to emit signals toward or receive signals from the windshield 316, for example. Alternatively, a different RF transfer device, such as a mmWave transfer device in a cell phone or other UE such as the UE 200 of FIG. 2A, may be fixed in position relative to the window assembly 300. In addition, the cell phone or other UE may be configured to have an adjustable position or orientation with respect to the window assembly 300, such that strength of an RF signal received at the cell phone or other UE, having been focused by the window assembly 300, may be optimized. In one implementation, the UE runs software that reports strength of the outside RF wave, having been focused by the window assembly, as a function of the position or orientation of the UE with respect to the window assembly as a user adjusts the position or orientation.

The window assembly 300 may be configured to provide a lensing effect, here a convergent focusing effect on incoming RF waves 312 that are to be received by the RF transfer device 310, or a collimating effect on outgoing RF waves 314 that have been transmitted by the RF transfer device 310. In one example, the outgoing RF wave 314 may be a substantially spherical RF wave, and the window assembly 300 may impart spatially dependent phase changes to the incident spherical wave such that a lensing effect occurs and a resulting RF wave 324 is substantially planar. The planar RF waves 324 can travel and be detected over substantially longer distances than without the window assembly 300. The window assembly 300 may be configured to provide beam steering directivity and/or other benefits as described herein. The window assembly 300 may increase sensitivity of the RF transfer device 310 to RF waves 322 that are incident upon the window assembly 300. The window assembly 300 can focus the RF wave 322, for example, from a parallel incident wave to a (spherical) converging wave that converges at a focal point coinciding with the RF transfer device 310.

Referring to FIG. 3B, with further reference to FIGS. 1-3A, an illustration of an interior of a vehicle 302 is provided. The vehicle 302 includes the RF system 320 illustrated in FIG. 3A, including the window assembly 300 as part of the windshield 316, and the RF transfer device 310 situated adjacent to the window assembly 300.

Figure 4:
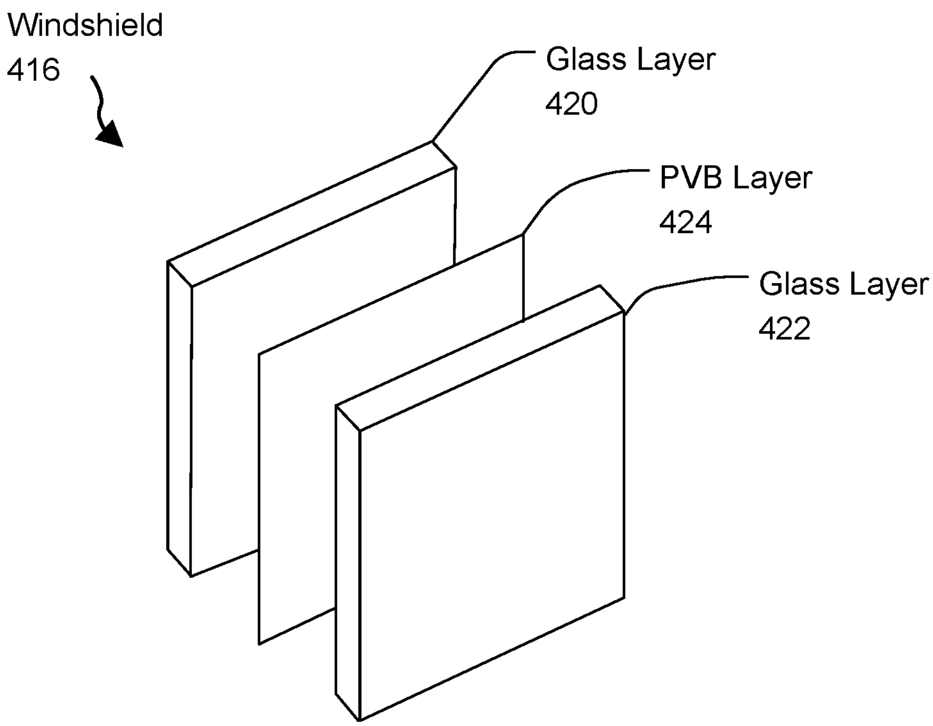
FIG. 4 Prior Art
FIG. 4 is an exploded-view diagram illustrating structure of an existing vehicle windshield.

Referring to FIG. 4, an exploded-view diagram illustrating an existing vehicle windshield structure 416 is shown. The existing windshield structure 416 includes a laminated glass construction, including a first glass layer 420, a second glass layer 422, and a polyvinyl butyral (PVB) layer 424 between the first and second glass layers 420, 422. Each of the first and second glass layers 420, 422 can be about 2 mm thick, with $\varepsilon_{r1}$=6.75 and tan δ=0.03. The PVB layer 424 can have a thickness of about 0.76 mm, with properties $\varepsilon_{r1}$=2.9 and tan δ=0.05, for example. The windshield structure 416 illustrated in FIG. 4 is one example of a window structure that can be modified to form a window assembly as discussed herein.

Figure 5A:
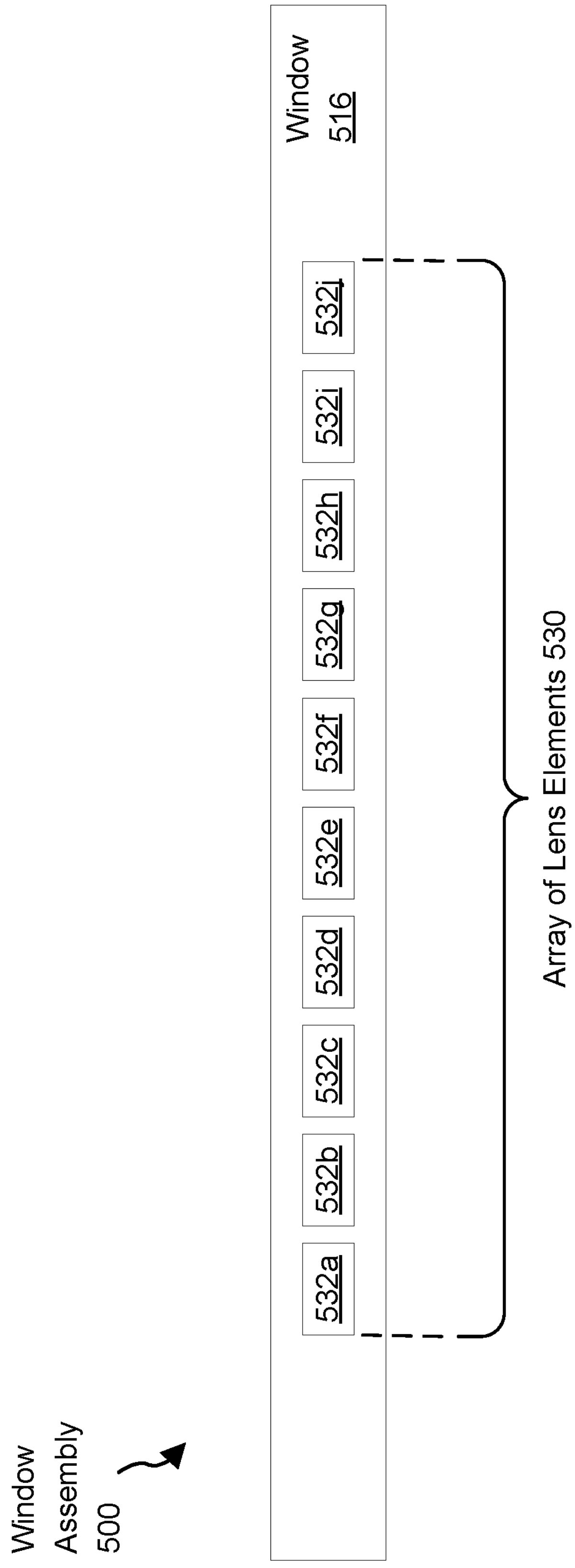
FIG. 5A is an edge-view diagram illustrating an example window assembly.

Referring to FIG. 5A, with further reference to FIGS. 1-4, an edge-view diagram is provided, illustrating a window assembly 500. The window assembly 500 is an example of a glass assembly and includes a window 516 and an array of lens elements 530 disposed in the window 516. The array of lens elements 530 includes, in this example, ten individual lens elements 532*a*, 532*b*, 532*c*, 532*d*, 532*e*, 532*f*, 532*g*, 532*h*, 532*i*, 532*j*. However, more generally, an array of lens elements consistent with the discussion herein can include two or more lens elements in various implementations. The array of lens elements 530 is a one-dimensional (1D) array with the lens elements 532*a*-532*j* oriented in a single line. Other implementations of arrays of lens elements may be used. For example, arrays of lens elements may be two-dimensional (2D) (by being oriented in a plane) or three-dimensional (3D) (where lens elements of the 3D array are not all oriented in the same line or plane).

Each lens element 532*a*-532*j* is optically transparent and electrically conductive. The array of lens elements 530 is configured to impart multiple phase shifts to an incident RF wave (not illustrated in FIG. 5A). In some implementations, each lens element 532*a*-532*j* or at least a certain component thereof is electrically isolated from adjacent lens elements of the array of lens elements 530. However, in other implementations, the lens elements 532*a*-532*j*, or certain components thereof, may not be electrically isolated from adjacent lens elements, or certain components thereof, of the array of lens elements 530.

In some implementations, the degree of optical transparency of the lens elements enables the window assembly 500 to have a visible light transmission (VLT) of about 70%, meaning that about 70% of visible light will pass through the window assembly. More broadly, in some implementations, the optical transparency of the lens elements enables the VLT of the window assembly 500 to be selected from the following examples: about 90%, at least 90%, about 70%, at least 70%, about 50%, at least 50%, about 35%, at least 35%, about 30%, at least 30%, about 15%, at least 15%, about 5%, at least 5%, between 30% and 90%, between 35% and 90%, between 35% and 70%, between 50% and 70%, and between 50% and 90%.

Figure 5B:
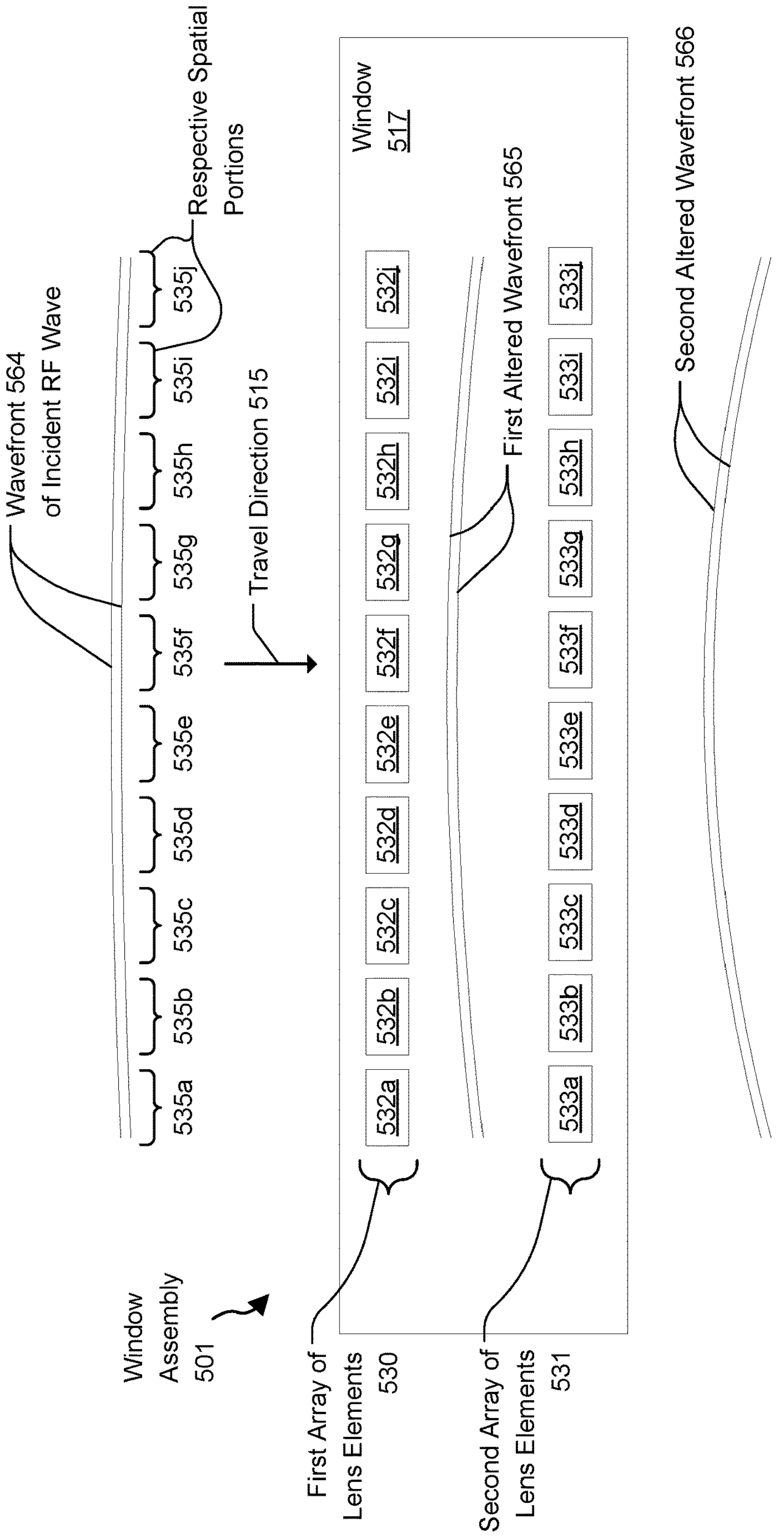
FIG. 5B is an edge-view diagram illustrating an alternative example window assembly having two layers of lens elements.

Referring to FIG. 5B, with further reference to FIGS. 1-5A, an edge-view (in particular, a side-view) diagram of an alternative example window assembly 501 is provided. The window assembly 501 includes a window 517 having disposed therein the array of lens elements 530 illustrated in FIG. 5A. The array of lens elements 530 may be referred to as a "first" array of lens elements 530 for purposes of FIG. 5B. The window assembly 501 has a second array of lens elements 531 disposed in the window 517, including example lens elements 533*a*, 533*b*, 533*c*, 533*d*, 533*e*, 533*f*, 533*g*, 533*h*, 533*i*, 533*j*. The lens elements 533*a*-533*j*, like the lens elements 532*a*-532*j*, are optically transparent and electrically conductive. In some implementations, each lens element 533*a*-533*j* or at least a certain component thereof is electrically isolated from adjacent lens elements of the array of lens elements 531. However, in other implementations, the lens elements 533*a*-533*j*, or certain components thereof, may not be electrically isolated from adjacent lens elements, or certain components thereof, of the array of lens elements 530. In this example, the window 517 is a dielectric material such as glass.

The plurality of phase shifts imparted to an incident RF wave by the first array of lens elements 530 may be termed a "first" plurality of phase shifts. The second array of lens elements 531 is configured to impart multiple second phase shifts to the RF wave. In FIG. 5B, this is illustrated by means of an example wavefront 564 of an RF wave traveling in a direction 515 toward the window assembly 501 until the RF wave is incident upon the window assembly 501. As the wavefront 564 is incident at the first array of lens elements 530, the lens elements 532*a*-532*j* impart a plurality of first phase shifts to respective spatial portions 535*a-j* of the wavefront 564. The plurality of first phase shifts includes two or more different phase shifts. For example, the ten lens elements 532*a*-532*j* may impart ten distinct phase shifts to the ten respective spatial portions 535*a*, 535*b*, 535*c*, 535*d*, 535*e*, 535*f*, 535*g*, 535*h*, 535*i*, 535*j*. Alternatively, the lens elements 532*a*-532*j* may impart a different quantity of phase shifts, e.g., two different phase shifts, such as one phase shift imparted by the lens elements 532*a*-532*e* to the spatial portions 535*a*-535*e*, and another phase shift imparted by the lens elements 532*f*-532*j* to the spatial portions 535*f*-535*j*.

The first plurality of phase shifts are configured to produce a first altered wavefront 565 of the incident RF wave. Similarly, the second plurality of phase shifts imparted by the second array of lens elements 531 produces a second altered wavefront 566 of the incident RF wave. In this manner, phase shifts imparted by the first and second arrays of lens elements 530, 531 are cumulative. Other quantities of arrays of lens elements may be used. Using at least two layers of arrays of lens elements, e.g., as in the example of FIG. 5B, may provide greater phase shifts than a single array of lens elements (while providing a relatively smooth wavefront), resulting in a shorter focal length of a window-implemented RF lens.

In the window assembly 501, each pair of respective lens elements 532*a*, 533*a*; 532*b*, 533*b*; 532*c*, 533*c*; . . . 532*j*, 533*j* is in mutual alignment along an axis parallel to the travel direction 515 (e.g., orthogonal to a surface of the window 517). However, in other implementations, the first and second arrays of lens elements may not have all pairs of respective lens elements aligned in this manner. Also or alternatively, different arrays of lens elements may consist of different numbers of lens elements. For example, an example implementation may include the first array of lens elements 532*a*-532*j* (with a total of 10 lens elements), while a second array of lens elements (not shown in FIG. 5B) may consist of a total of 15 lens elements.

The window assembly 501 may be part of a vehicle window. In this case, the incident wavefront 564 may be planar and originate from outside the vehicle (e.g., from a base station). The travel direction 515 may be considered to be toward the vehicle window. Following alteration by the first array of lens elements 530 and then the second array of lens elements 531, the second altered wavefront 566 may be substantially spherical to facilitate receipt by an RF transfer device. In addition, the same RF transfer device may transmit, in a direction opposite the direction 515, from the vehicle by the vehicle window, a spherical wave. The spherical wave can be incident at the vehicle window (the lower side illustrated in FIG. 5B), then altered, first by the array of lens elements 531, and then by the array of lens elements 530, to become a substantially planar RF wave. For this RF wave traveling in the direction opposite the direction 515, the pluralities of phase shifts imparted to an incident RF wave by the second and first arrays of lens elements 531, 530 may be termed "first" and "second" pluralities of phase shifts.

Figure 6:
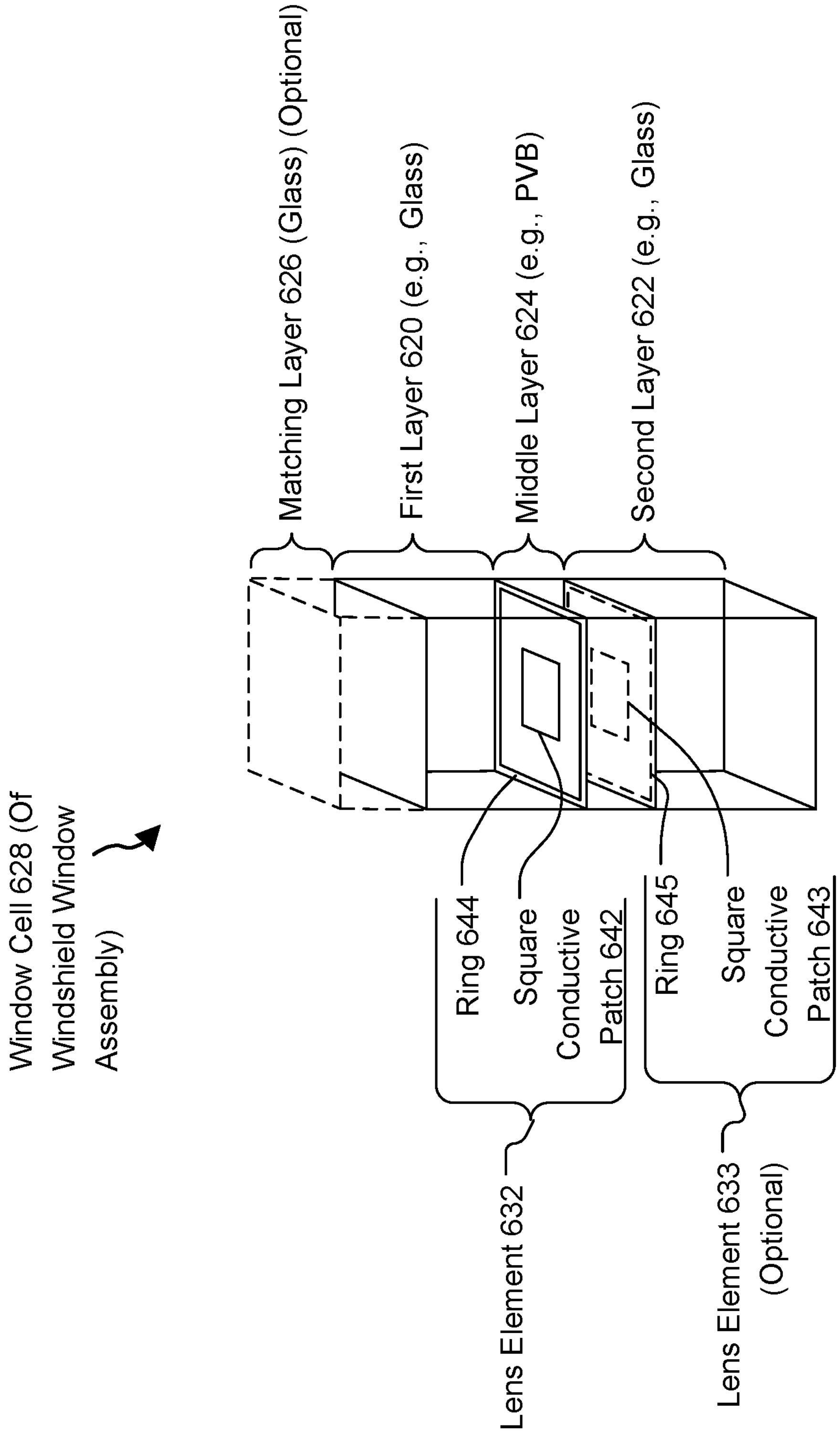
FIG. 6 is a perspective-view diagram illustrating an example window cell of an example windshield-type window assembly.

Referring now to FIG. 6, with further reference to FIGS. 1-5B, a perspective-view diagram of an example window cell 628 of an example windshield-type window assembly is provided. A "window cell," as used herein, is a geometric section of a window, which may include a lens element (if a phase shift is to be applied by the window cell), as well as a dielectric material in which the lens element is disposed. The dielectric material may surround the lens elements and may electrically isolate the lens element, or a component of the lens element, from one or more neighbor lens elements in one or more neighbor (e.g., adjacent) window cells. A window cell may also include other lens elements in other respective layers. The window cell may not be physically partitioned or spaced from other portions of the window, but rather may be integral with the remaining portions of the window and with other window cells.

The window cell 628 includes a first layer 620, which can be glass and can have properties similar to those of the glass layer 420 of FIG. 4. The window cell 628 also includes a second layer 622, which can be glass and can have properties similar to those of the glass layer 422 shown in FIG. 4. The window cell 628 also includes a middle layer 624 between the first layer 620 and the second layer 622. The middle layer 624 is PVB in this example and can have properties similar to the PVB layer 424 of FIG. 4. The window cell 628 includes a lens element 632, which in this example includes two components: a rectangular conductive patch, in particular a square conductive patch 642; and a conductive ring 644. The ring 644 surrounds the square conductive patch 642 such that a gap exists between the ring 644 and conductive patch 642. Both the square conductive patch 642 and the ring 644 are optically transparent and electrically conductive, and the ring 644 can be formed of the same material as the square conductive patch 642. The ring 644 is positioned at a periphery of the window cell 628 and may be configured to be in physical and electrical contact with rings in adjacent window cells (not shown in FIG. 6). Nonetheless, in this example, the square conductive patch 642 component is configured to be electrically isolated from the ring 644 and from conductive patches and rings of adjacent window cells (not shown in FIG. 6). In other implementations, a conductive patch can be of a different shape such as a non-square rectangle or a circle. Further in the FIG. 6 example, the ring 644 is square and positioned concentrically with the square conductive patch 642. However, in other implementations, a ring may be of a different shape such as circular, cross-shaped, or polygonal (e.g., non-square rectangular or hexagonal) and the shape of the ring may not match the shape of the conductive patch it encloses; and additionally or alternatively, the ring may be positioned non-concentrically with respect to the conductive patch. The lens element 632 in this example is disposed between the middle layer 624 and the first layer 620.

The lens element 632 may be made both optically transparent and electrically conductive by various means. In one example, the square conductive patch 642 and the ring 644 are both formed of a transparent conductive material, such as a transparent conductive oxide (TCO) [e.g., indium tin oxide (ITO), a wider-spectrum TCO, fluorine doped tin oxide (FTO), niobium doped anatase $TiO_2$ (NTO), doped zinc oxide, etc.]. In other examples, the square conductive patch 642 and the ring 644 are both formed of a conductive polymer, graphene, a metallic grid or mesh material, or an ultra thin metal film. In yet other examples, the square conductive patch 642, the ring 644, or both may be formed of a material that is substantially opaque in the visible light portion of the electromagnetic spectrum, such as substantially opaque metallic portions of a metallic mesh material. Nonetheless, even in examples wherein the square conductive patch 642, the ring 644, or both are substantially opaque, the lens element 632 may be optically transparent by means of transparent material situated between the conductive patch 642 and the ring 644.

The window cell 628 may include an optional lens element 633 and/or an optional matching layer 626. In this example, the optional lens element 633 comprises a square conductive patch 643 and a ring 645, which is also square. The optional lens element 633 is disposed in the window cell 628 displaced from the lens element 632, e.g., in a different layer of the window cell 628. In particular, in this example, the lens element 633 is disposed between the second layer 622 and the middle layer 624. In other implementations, the optional lens element 633 may have any of the features described in connection with other implementations for the lens element 632. The optional matching layer 626 (e.g., made of glass in this example) may be configured to help match an impedance of the window cell 628 to free space to improve transmission of an incident RF wave from free space into the first layer 620 (or transmission of an outgoing wave from the window cell 628 into free space). Not illustrated in FIG. 6 is one or more other optional matching layers that may be included in the window cell 628, e.g., at a bottom of the window cell, adjacent to the second layer 622.

In the example described above, the lens element(s) are illustrated as being sandwiched between two layers of glass. In other examples, the lens element(s) may be disposed on an outside surface of one or more of the layers or glass, or may be disposed on a surface of a single layer of glass. In some such embodiments, rather than the lens element being manufactured together with the glass, an assembly may be constructed after manufacturing by applying a lens element (for example in sticker form) to the glass. Further, the lens element(s) may be disposed on a transparent substrate other than glass (e.g., a plastic or plexiglass).

Figure 7B:
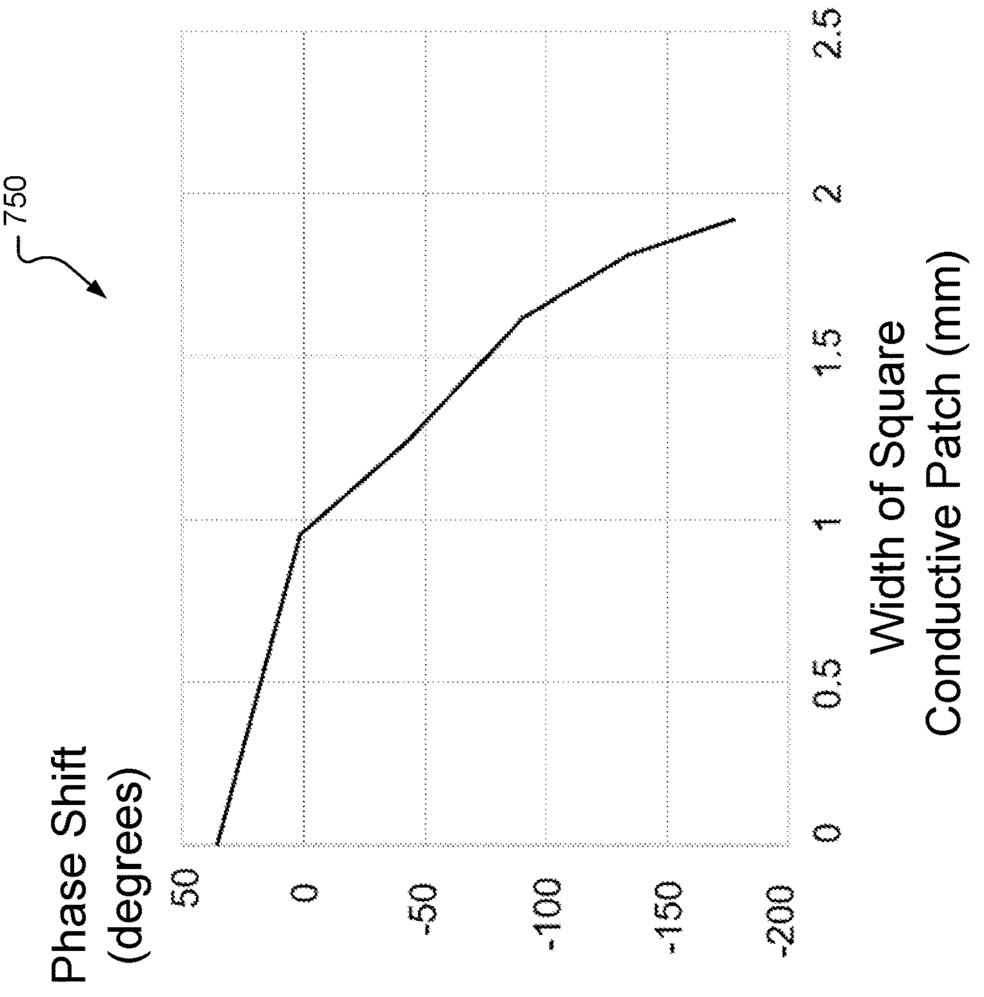
FIG. 7B is a graph showing example phase shift imparted to an incident RF wave as a function of the varying size of conductive patches as illustrated in FIG. 7A.
Figure 7A:
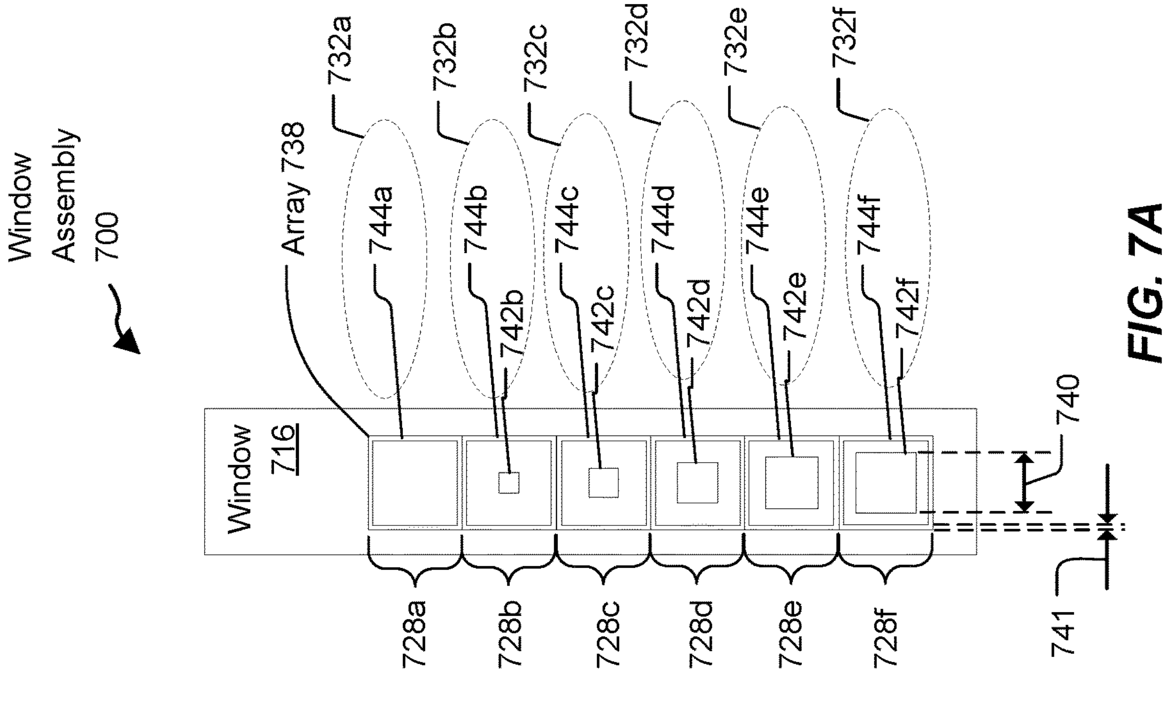
FIG. 7A is a plan-view illustration showing a window assembly with lens elements of conductive patches of various sizes.

Referring to FIG. 7A, with further reference to FIGS. 1-6, a plan-view illustration showing an example window assembly 700 is provided. The example window assembly 700 includes an array 738 of window cells, including window cells **728*a*, 728*b*, 728*c*, 728*d*, 728*e*, 728*f*. The window cell 728*a* has a lens element 732*a* that includes only a square ring 744*a*, without a conductive patch. The window cells 728*b*-728*f* include respective rings 744*b*, 744*c*, 744*d*, 744*e*, 744*f* and respective square conductive patches 742*b*, 742*c*, 742*d*, 742*e*, 742*f*. Respective rings 744*b*-744*f* are approximately the same size and shape and surround respective square conductive patches 742*b*-742*f*. Each of the square conductive patches 742*b*-742*f* is of a different size than the square conductive patches of the other window cells of the window cells 728*b*-728*f*. The different sizes of the square conductive patches 742*b*-742*f* can be used to impart different respective phase shifts to different spatial portions of an incident RF wave. The window cell 728*d* may, for example, be the window cell 628 of FIG. 6, with the conductive patch-based lens element 632. The patches 742*b*-742*f* of the lens elements 732*b*-732*f* in this example are all conductive patches, and all have a square shape. In this example, since the patches 742*b*-742*f* are square conductive patches, each having four sides of equal width and length, a size of each conductive patch lens element may be characterized by a single width parameter 740, as shown. The shape of each of conductive patches 742*b*-742*f* in this example is a square, but other shapes (e.g., rectangles, circles) of lens elements may be used, and different conductive patches may have different shapes. Using the same shape for each conductive patch and/or using conductive patches of shapes that are symmetrical along orthogonal axes may help provide symmetrical focusing of incident wavefronts (e.g., for dual-polarized waves). An example thickness 741 of the rings 744***a*-744*f* can be 0.1 mm in some implementations.

Referring to FIG. 7B, with further reference to FIG. 7A, a graph 750 shows example phase shifts imparted to an incident RF wave as a function of the varying size of conductive patches of lens elements like those of FIG. 7A. In particular, FIG. 7B illustrates phase shift, in degrees, as a function of the width 740 of square conductive patches of lens elements, here the lens elements 732*b*-732*f* for the example window assembly 700 of FIG. 7A. As shown, different configurations of lens elements, here different sizes of conductive square patch lens elements, impart different phase shifts on incident waves. For the patch sizes tested as shown in the graph 750, patches with widths 740 of about 0.95 mm, about 1.25 mm, about 1.65 mm, about 1.8 mm, and about 1.9 mm provided phase shifts of about −35°, about −80°, about −125°, about −170°, and about −210°, respectively, relative to no conductive patch being present in the lens element (e.g, lens element 732*a* of FIG. 7A, with the width 740 being zero). Thus, as illustrated by the examples of FIGS. 7A-7B, an array of lens elements having patches of different sizes can be configured to impart a plurality of phase shifts that spans a range of phase shifts. By using lens elements with square conductive patches of different widths, for example, the range of phase shifts may span a range of at least 175°, as indicated in the example values above, or other ranges such as at least 150° or at least 90°. Furthermore, ranges of phase shifts may be greater than 175° or less than 90° in other implementations. Window cells with different lens element configurations may be disposed in an array to provide coordinated phase shifts to provide a lens effect, e.g., to focus a wavefront (e.g., from a planar wavefront to a spherical wavefront focused on a receiver and/or, e.g., to collimate a wavefront from a spherical wavefront into a planar wavefront). Varying phase shift across an assembly, e.g., a window assembly, may allow the assembly to function as a lens or to alter wavefronts of incident RF waves in other manners. The smoothness of an altered wavefront may depend on various factors such as amounts of phase shifts imparted by lens elements, disparities between phase shifts imparted by neighboring lens elements, a granularity of the lens elements (e.g., sizes of cells containing the lens elements), etc.

Figure 8:
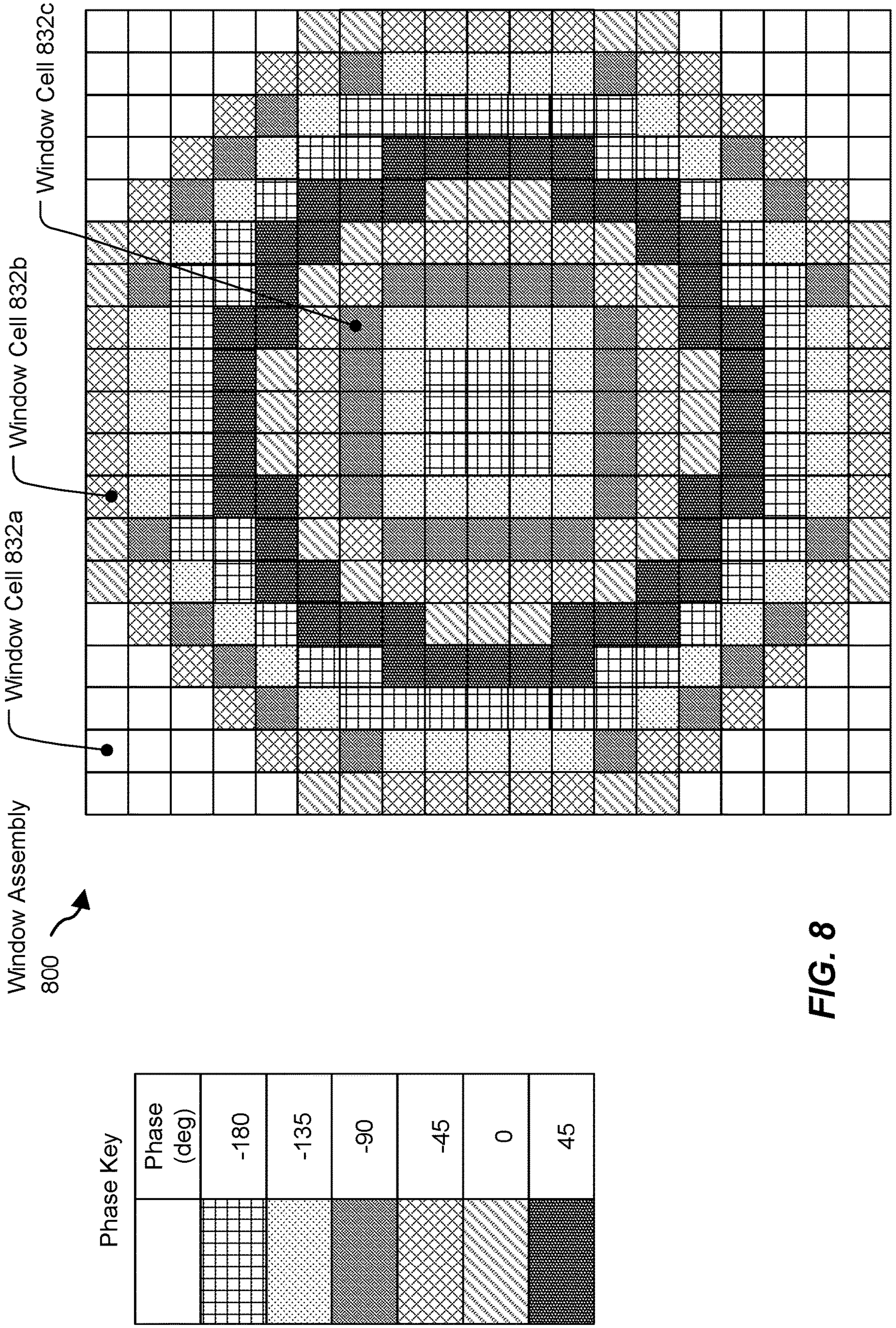
FIG. 8 is a plan-view illustration of a window assembly, diagrammatically showing example quantized phase shifts imparted to an incident RF wave as a function of spatial position.

Referring to FIG. 8, with further reference to FIGS. 1-7B, a plan-view illustration of an example window assembly 800 is provided. By means of fill patterns in various window cells of the window assembly 800 (e.g., window cells 832*b*, 832*c*), FIG. 8 diagrammatically shows example quantized phase shifts imparted to an incident RF wave as a function of 2D spatial position over the window assembly 800. The quantized phase shifts are provided at various window cells by corresponding lens elements (not shown in FIG. 8), which in this example include square conductive patches and respective square, conducting, surrounding rings, as illustrated in FIG. 7A. As examples, window cells 832*b* and 832*c* have lens elements that are configured to impart phase shifts of −45° and −90°, respectively, as can be seen by reference to a phase shift key 810 at the left of FIG. 8. Some window cells around the periphery of the window assembly 800 (e.g., window cell 832*a*) include lens elements with only a surrounding, peripheral ring, and no center conductive patch, similar to the window cell 728*a* in FIG. 7A, and are not configured to impart phase shifts associated with conductive patches. In this example, window cells with six different phase shifts are provided, but other quantities of different phase shifts may be provided, e.g., with different window cell configurations. For example, window cells may be configured to provide a 90° phase shift and a 135° phase shift to provide a finer resolution of phase distributions, which may provide a finer-resolution conversion of a spherical wave to a plane wave or a finer-resolution conversion from a plane wave to a spherical wave compared to the conversion(s) provided by the window assembly 800.

The window assembly 800 has subsets of window cells corresponding to particular phase shifts disposed approximately concentric with each other. For example, window cells imparting a phase shift of −45°, including the example window cell 832*b*, may be considered a first subset of the window cells. The first subset of the window cells may have a first subset of lens elements therein, which are not shown in FIG. 8, but each of which may be similar to one of the lens elements 732*b*-732*f* of FIG. 7A, for example. Window cells imparting a phase shift of −90°, including the example window cell 832*c*, may be considered a second subset of the window cells. The second subset of the window cells may have a second subset of lens elements therein, which are not shown in FIG. 8, but each of which may be similar to another one of the lens elements 732*b*-732*f* of FIG. 7A, for example. These two subsets of window cells, with their corresponding lens elements, are disposed in two substantially circular rings, concentrically aligned with each other to share a center. These two rings are circular within limits imposed by the shapes of the window cells (and corresponding quantization of phase shifts).

An array of concentric circles as described above can be advantageous as a means for altering an incident RF wave that is spherical into an altered RF wave that is planar, and/or for altering an incident RF wave that is planar into an altered RF wave that is spherical (i.e., as a means for focusing the incident RF wave to produce a focused RF wave that is spherical). In such examples, the phase shifts may be distributed such that a spherical RF wave which is incident on the window assembly will have an approximately equal phase across an area of a given plane after various spatial portions of the spherical RF wave pass through respective lens elements. Changing between spherical and planar waves is an example, many other configurations of window cells may be implemented for altering a wavefront in other ways. Further, concentricity of window cells is not limited to concentric circles of window cells. For example, one subset of window cells disposed in a first shape (e.g., a rectangle, a square, an ellipse, etc.) may be arranged concentrically with another subset of window cells disposed in a second shape (e.g., a rectangle, a square, an ellipse, etc.) with the two subsets sharing a common geometric center and likely sharing a shape. Also or alternatively, the two subsets of window cells may share a common focus.

Different phase distributions and sizes of window assemblies may be configured to provide different focal lengths, For example, the window assembly 800, with the phase distribution shown and for window cells of about 2.8 mm×2.8 mm, can provide a focal length of about 10 mm, being implemented in a section of window having a length and a width each of about 53 mm. An example phase shift distribution to achieve spherical-planar RF wave transformation for an m×n array, such as in the window assembly 800, may be specified by $$\varphi(m, n) = \frac{2\pi}{\lambda}\left(\sqrt{(mp)^2 + (np)^2 + L^2} - L\right) + \varphi(0, 0) \tag{1}$$

where p is a unit size of a window cell in the array, A is a carrier wavelength of an incident RF wave, and L is the desired focal length (also referred to herein as focal distance) of the window assembly.

Figure 9:
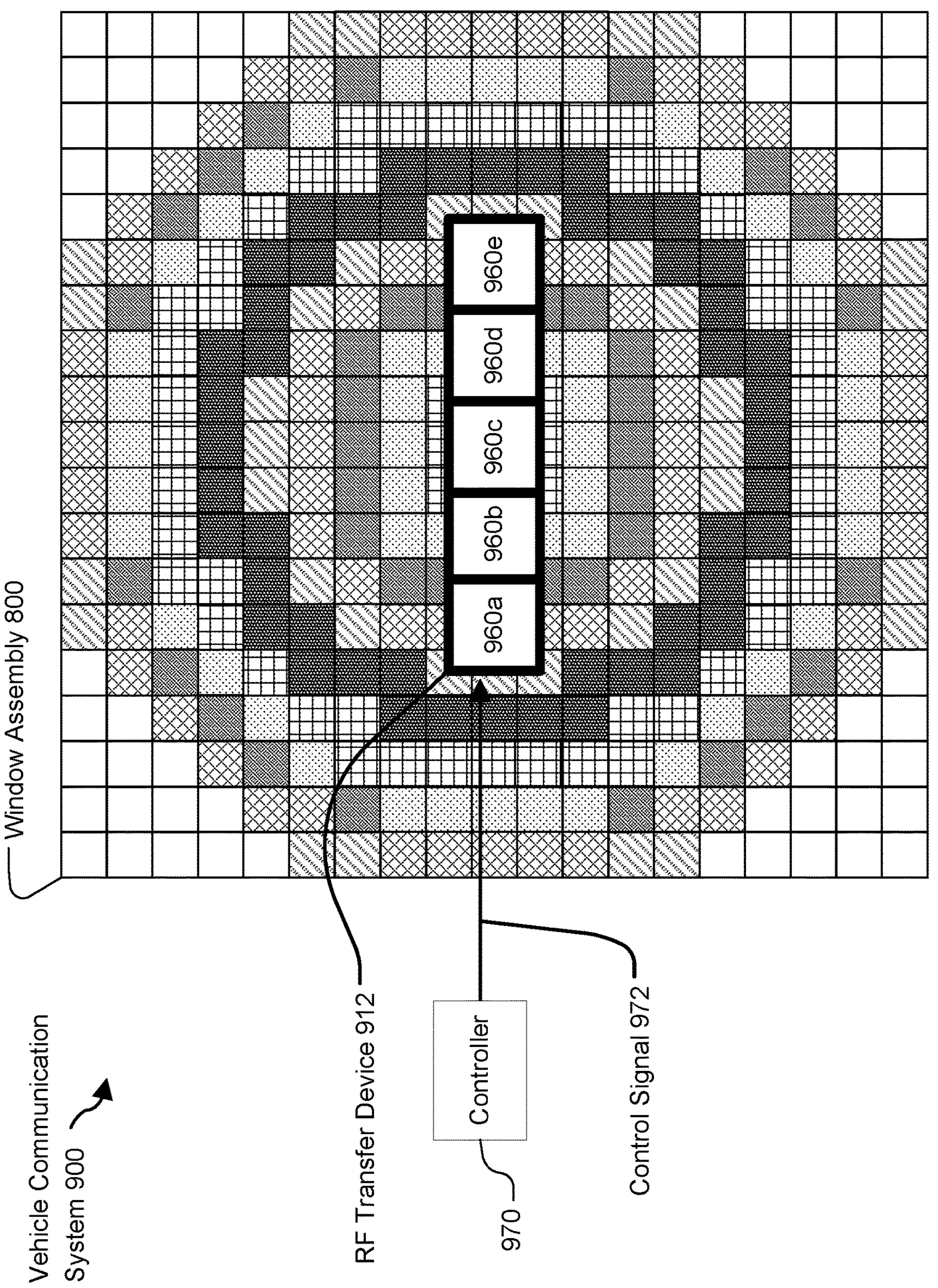
FIG. 9 is a plan-view illustration of a vehicle communication system including the window assembly of FIG. 8 and a patch antenna array.

Referring to FIG. 9, with further reference to FIGS. 1-8, a plan-view illustration of an example vehicle communication system 900 is provided. The vehicle communication system 900, which is an example of a wireless communication device (e.g., 110), includes the window assembly 800 and an RF transfer device 912 situated adjacent to the window assembly 800. In this example, the RF transfer device 912 is a 1×5 patch antenna array configured to transmit and receive mmWave RF communication signals. In particular, the RF transfer device 912 includes one or more RF transceivers including patch antennas 960*a*, 960*b*, 960*c*, 960*d*, 960*e* (also referred to herein as a plurality of RF transmitters), although other forms of antennas may be used. The RF transfer device 912 may be situated at a focal plane of the window assembly 800, which is configured to convert spherical RF waves to parallel RF waves, and vice versa.

The vehicle communication system 900 may be controlled for beam steering and/or beam size selection. For example, a scanning controller 970 may be communicatively coupled to the antennas 960*a*-960*e* and may send a control signal 972 to the RF transfer device 912 to control phases of signals transmitted by the antennas 960*a*-960*e* selectively to perform beam scanning. In addition, a beam size of an RF wave transmitted by the RF transfer device 912 and altered (e.g., collimated to have a planar wavefront) by the window assembly 800 can be selected by selective activation of the antennas 960*a*-960*e*. For example, the controller 970 may activate only the center patch antennas 960*b*-960*d* to provide a wider beam than activating only the center patch 960*c*.

Other implementations of vehicle communication systems may be used. For example, the RF transfer device 912 may be replaced by a 2D patch antenna array, which may be used to effect beam steering and beam size control in two dimensions. The RF transfer device 912 may be part of an on-board vehicle communication device or a UE such as the UE 200 of FIG. 2A, for example.

As noted above, lens elements may be arranged approximately concentrically, but are not required to be disposed in such pattern. In other patterns, the lens elements are arranged in a non-concentric symmetric pattern. In some examples, the lens elements may be patterned for use in a substantially flat glass assembly (for example, as may be used in a window of a building). In other examples, the lens elements are patterned to produce appropriate phase shifts when the glass assembly is curved (for example, as may be necessary in certain automobile windshields or rear windows or portions thereof). Similarly, the pattern may be varied to accommodate an array of antennas which is tilted with respect to (e.g., not parallel to a surface of) the glass assembly. Those of skill in the art will understand that the pattern of lens elements may be adjust any number of ways to optimize any number of communication systems, and that the glass assembly may be incorporated into any number of different implementations, for example a side window of a vehicle, an access point or CPE having a cuboidal shape, etc.

Figure 10A:
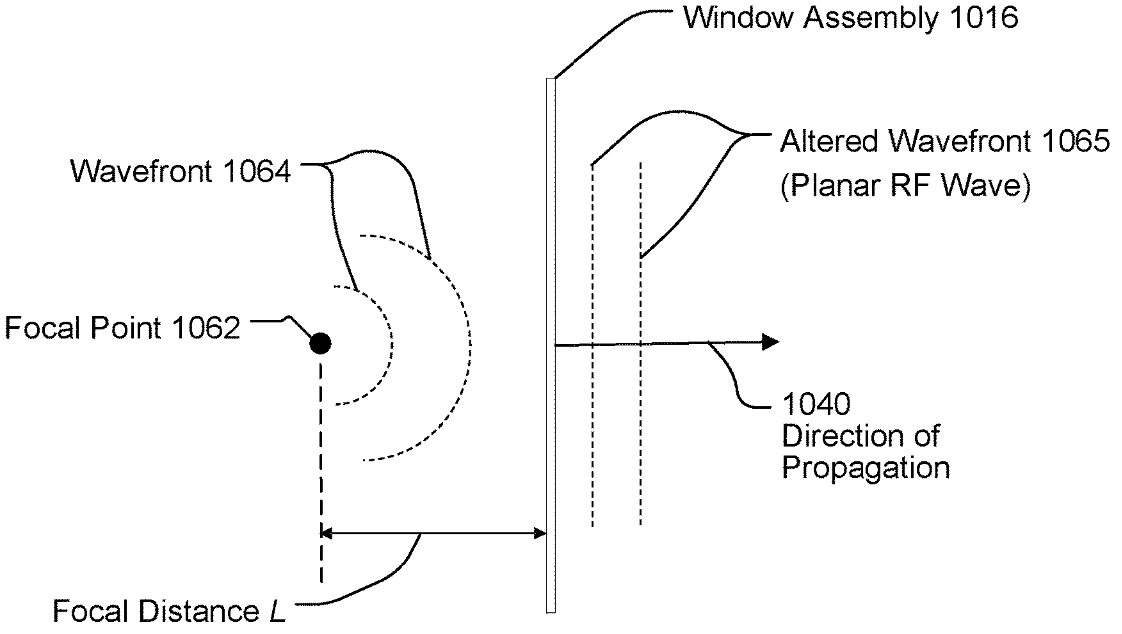
FIG. 10A is a side view of propagation and altering of a spherical RF wave into a planar RF wave by a window assembly.

Referring to FIG. 10A, with further reference to FIGS. 1-9, an edge-view diagram illustrating example propagation and collimation-type alteration of an incident spherical RF wave into a planar RF wave is provided. A wavefront 1064 of a spherical RF wave emanates from a focal point 1062. The focal point 1062 may be the location of an RF transfer device, such as the patch antenna array RF transfer device 912 of FIG. 9 or the RF transfer device 310 positioned on the dashboard 318 inside a vehicle as in FIG. 3A. The spherical RF wave may be produced by an RF transmission of the RF transfer device. A window assembly 1016 has lens elements that are not shown in FIG. 10 but are similar to the lens elements included in the window cells of FIGS. 8-9 and are arranged concentrically, with a radial variation in phase shift. The window assembly 1016 is configured to impart a lensing effect, here a collimation effect of a concentrically-varying refraction-type alteration to the wavefront 1064, to produce an altered wavefront 1065 in a direction 1040. Since the window assembly 1016 is separated from the focal point 1062 source by a focal distance L of the window assembly 1016, the incident spherical RF wave becomes a planar RF wave.

Figure 10B:
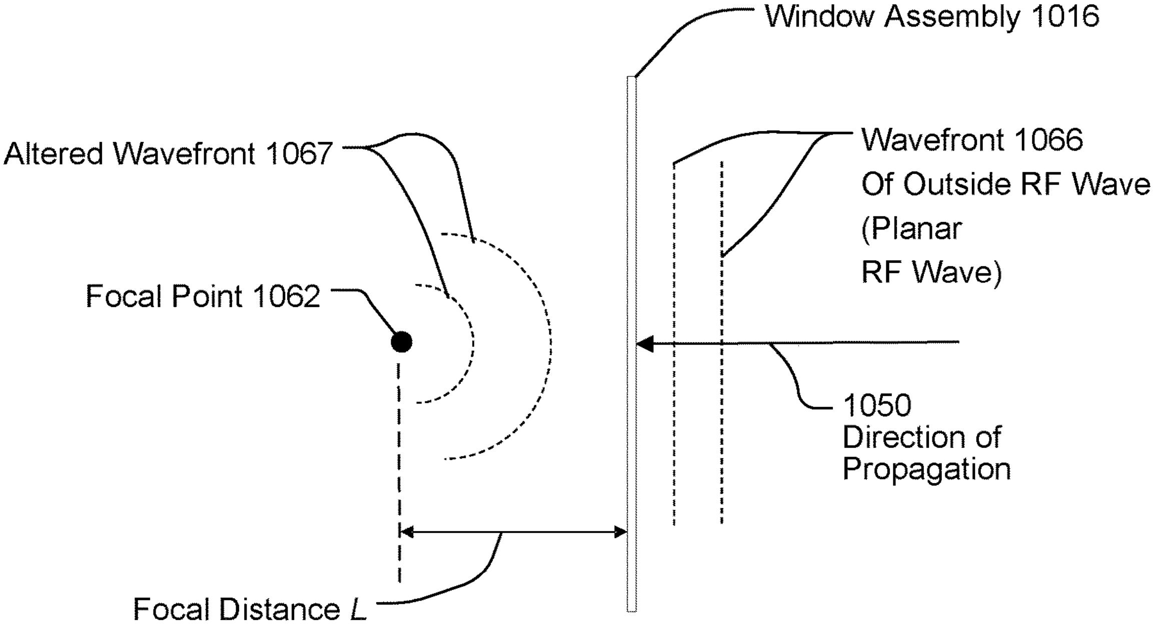
FIG. 10B is a side view of propagation and altering of a planar RF wave into a spherical wave by a window assembly.

Referring to FIG. 10B, with further reference to FIGS. 1-10A, an edge-view diagram similar to that of FIG. 10A is provided, except with the direction of propagation of the RF wave in FIG. 10B opposite the direction in FIG. 10A. A wavefront 1066 of an outside RF wave that originates on the right side of the diagram (e.g., outside of a vehicle) is planar when incident upon the window assembly 1016 in a direction 1050. A wavefront 1066 of an outside RF wave (e.g., originating outside a vehicle) is planar. The window assembly 1016 alters the wavefront 1066 by focusing the wavefront 1066 into an altered wavefront 1067 that is spherical such that the planar wave becomes a spherical wave. The spherical RF wavefront converges to the focal point 1062 at the focal distance L from the window assembly 1016. An RF transfer device may be placed at the focal point 1062, as described in connection with FIG. 10A, and the focusing by the window assembly 1016 may help to increase received signal strength. A vehicle communication system such as illustrated in FIG. 3A, FIG. 3B, or FIG. 9, e.g., configured consistent with the features described in connection with FIGS. 10A and 10B, may provide beam steering and beam sizing capabilities, as well as enhanced signal detection and transmission which may improve communication between a vehicle and another device and/or a network.

Figure 11:
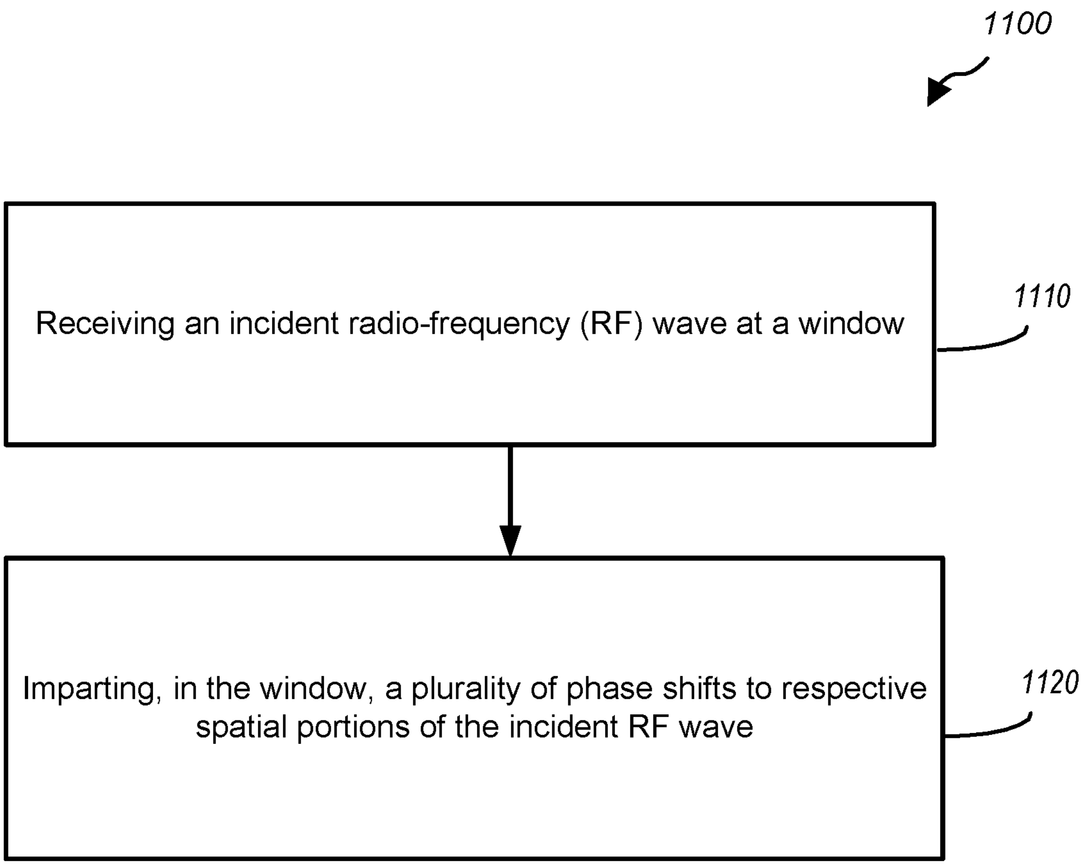
FIG. 11 is a flow diagram illustrating a method of altering a wavefront.

Referring to FIG. 11, with further reference to FIGS. 1-10B, a method 1100 of altering a wavefront includes the stages shown. The method 1100 is, however, an example only and not limiting. The method 1100 may be altered, e.g., by having one or more stages added, removed, rearranged, combined, performed concurrently, and/or by having one or more single stages split into multiple stages. The method 1100 may be used, for example, to perform functions of a vehicle communication system, such as the vehicle communication system 340.

At stage 1110, the method 1100 includes receiving an incident radio-frequency (RF) wave at a window. At stage 1120, the method 1100 includes imparting, on or in the window, a plurality of phase shifts to respective spatial portions of the incident RF wave.

Implementations of the method 1100 may include one or more of the following features, individually or in combination.

In an example implementation, the window may be a vehicle windshield or other vehicle window, such as the windshield 316. The window may be the window 516, the window 517, or the window 716. The window may have a layer structure, such as exemplified by the window cell 628. The incident RF wave may, for example, have one of the wavefronts 564, 1064, 1066.

The plurality of phase shifts may be imparted by an array of lens elements disposed in the window, such as one or more of the arrays of lens elements 330, 530, 531. The plurality of phase shifts may be imparted by window cells having lens elements disposed therein, such as the array of window cells 738 or the array of window cells of the window assembly 800 illustrated in FIGS. 8-9. Any of the arrays of lens elements 330, 530, 531, or the window assembly 800 may, for example, comprise means for imparting the plurality of phase shifts to respective spatial portions of the incident RF wave.

Each lens element of the array of lens elements may be transparent and electrically conductive. In some implementations, each lens element of the array of lens elements, or a component thereof such as a conductive patch, may be electrically isolated from adjacent lens elements of the array of lens elements. The electrical isolation from adjacent lens elements may be provided by one or more dielectric materials between lens elements, e.g., surrounding one or more of the lens elements, such as material of the windshields or windows 316, 516, 517, 716, or layers of the window cell 628. The phase shifts of the plurality of phase shifts may be imparted by, and correspond to, distinct sizes (and/or shapes) of components of lens elements of the array of lens elements, e.g., as described in connection with the window assembly 700.

The plurality of phase shifts in the method 1100 may be a plurality of first phase shifts, and imparting the plurality of first phase shifts may produce a first altered wavefront of the incident RF wave. The method 1100 may further include imparting, to the first altered wavefront of the incident RF wave, a plurality of second phase shifts to produce a second altered wavefront of the incident RF wave. For example, the first array of lens elements 530 may impart first phase shifts to the wavefront 564 to produce the first altered wavefront 565, and the second array of lens elements 531 may impart second phase shifts to the first altered wavefront 565 to produce the second altered wavefront 566. The array of lens elements 530 may comprise means for imparting the first phase shifts and the array of lens elements 531 may comprise means for imparting the second phase shifts. Similarly, the array of lens elements 531 may comprise means for imparting the first phase shifts and the array of lens elements 530 may comprise means for imparting the second phase shifts for an outgoing wave (e.g., a wave traveling in the opposite direction from the travel direction 515).

Imparting the plurality of phase shifts in the method 1100 may include altering the incident RF wave from a substantially spherical RF wave into a substantially planar RF wave. For example, the window assembly 800 may alter the incident RF wave from a spherical RF wave, such as the RF wave having the wavefront 1064, into a planar RF wave, such as the RF wave having the altered wavefront 1065.

Imparting the plurality of phase shifts in the method 1100 may include focusing the incident RF wave, such the RF wave having the wavefront 1066, to produce a focused incident RF wave, such as the spherical RF wave having the altered wavefront 1067. The method 1100 may further include receiving the focused incident RF wave, such as receiving a focused incident RF wave by the RF transfer device 310 or the RF transfer device 912. The RF transfer device 310 or the RF transfer device 912 may comprise means for receiving a focused incident RF wave.

IMPLEMENTATION EXAMPLES

Implementation examples are provided in the following numbered clauses.

Clause 1. A window assembly comprising:
- a window; and
- an array of lens elements disposed on or in the window, wherein each lens element of the array of lens elements is optically transparent and electrically conductive, the array of lens elements being configured to impart a plurality of phase shifts to an incident radio-frequency (RF) wave.

Clause 2. The window assembly of clause 1, wherein respective phase shifts of the plurality of phase shifts correspond to respective sizes of lens elements components of the array of lens elements.

Clause 3. The window assembly of clause 1 or clause 2, wherein the array of lens elements is a first array of lens elements and the plurality of phase shifts is a plurality of first phase shifts configured to produce a first altered wavefront of the incident RF wave, the window assembly further comprising a second array of lens elements disposed on or in the window, wherein each lens element of the second array of lens elements is optically transparent and electrically conductive, the second array of lens elements being configured to impart a plurality of second phase shifts, to the first altered wavefront of the incident RF wave, to produce a second altered wavefront of the incident RF wave.

Clause 4. The window assembly of any of clauses 1-3, wherein the window comprises a first layer and a second layer, and wherein the array of lens elements is disposed between the first layer and the second layer.

Clause 5. The window assembly of clause 4, further comprising a middle layer between the first layer and the second layer, the array of lens elements being disposed between the first layer and the middle layer.

Clause 6. The window assembly of clause 5, wherein the middle layer comprises polyvinyl butyral (PVB).

Clause 7. The window assembly of clause 5 or clause 6, further comprising a matching layer adjacent to the first layer and separated from the middle layer.

Clause 8. The window assembly of any of clauses 1-7, wherein the array of lens elements is further configured to alter the incident RF wave from a spherical RF wave into a planar RF wave.

Clause 9. The window assembly of any of clauses 1-8, wherein the array of lens elements is further configured to impart the plurality of phase shifts to a mmWave RF signal, and wherein the plurality of phase shifts spans a range of phase shifts of at least 90°.

Clause 10. The window assembly of any of clauses 1-9, wherein a first subset of lens elements of the array of lens elements correspond to one phase shift of the plurality of phase shifts and are disposed concentrically with a second subset of lens elements of the array of lens elements corresponding to another respective phase shift of the plurality of phase shifts.

Clause 11. The window assembly of any of clauses 1-10, wherein lens elements of the array of lens elements comprise conductive patches of different sizes corresponding to the plurality of phase shifts.

Clause 12. The window assembly of clause 11, wherein the lens elements of the array of lens elements comprise rectangular conductive patches.

Clause 13. The window assembly of clause 11 or clause 12, wherein the lens elements of the array of lens elements further comprise conductive rings surrounding respective conductive patches of the array of lens elements.

Clause 14. The window assembly of any of clauses 1-13, wherein a component of each lens element of the array of lens elements is electrically isolated from adjacent lens elements of the array of lens elements.

Clause 15. A vehicle communication system comprising:

the window assembly of any of clauses 1-14, wherein the window is a window of a vehicle; and an RF transfer device situated adjacent to the window assembly, the RF transfer device configured to produce the incident RF wave and to receive an outside RF wave originating outside the vehicle and having been focused by the window assembly.

Clause 16. The vehicle communication system of clause 15, wherein the RF transfer device comprises a plurality of RF transmitters, the vehicle communication system further comprising a scanning controller communicatively coupled to the plurality of RF transmitters and configured to activate the plurality of RF transmitters selectively to perform beam scanning.

Clause 17. The vehicle communication system of clause 15 or clause 16, wherein the RF transfer device is part of a user equipment (UE), the UE configured to report a strength of the outside RF wave, having been focused by the window assembly, as a function of position or orientation of the UE with respect to the window assembly.

Clause 18. A method of altering a wavefront, the method comprising:

receiving an incident radio-frequency (RF) wave at a window; and imparting, on or in the window, a plurality of phase shifts to respective spatial portions the incident RF wave.

Clause 19. The method of clause 18, wherein the plurality of phase shifts is a plurality of first phase shifts, and wherein imparting the plurality of first phase shifts produces a first altered wavefront of the incident RF wave, the method further comprising imparting, to the first altered wavefront of the incident RF wave, a plurality of second phase shifts to produce a second altered wavefront of the incident RF wave.

Clause 20. The method of clause 18 or clause 19, wherein imparting the plurality of phase shifts includes altering the incident RF wave from a spherical RF wave into a planar RF wave.

Clause 21. The method of any of clauses 18-20, wherein imparting the plurality of phase shifts includes focusing the incident RF wave to produce a focused incident RF wave, the method further comprising receiving the focused incident RF wave.

Clause 22. The method of clause 21, further comprising:

receiving the focused, incident RF wave at a user equipment (UE); and reporting to a user a strength of the focused incident RF wave as a function of position or orientation of the UE with respect to the window.

Clause 23. A window assembly comprising:

a window; and means for imparting, on or in the window, a plurality of phase shifts to respective spatial portions an incident radio-frequency (RF) wave.

Clause 24. The window assembly of clause 23, wherein the means for imparting the plurality of phase shifts are for imparting a plurality of first phase shifts to the incident RF wave to produce a first altered wavefront of the incident RF wave, the window assembly further comprising means for imparting, to the first altered wavefront of the incident RF wave, a plurality of second phase shifts to produce a second altered wavefront of the incident RF wave.

Clause 25. The window assembly of clause 23 or clause 24, wherein the means for imparting the plurality of phase shifts include means for altering the incident RF wave from a spherical RF wave into a planar RF wave.

Clause 26. The window assembly of any of clauses 23-25, wherein the means for imparting the plurality of phase shifts include means for focusing the incident RF wave to produce a focused incident RF wave, the window assembly further comprising means for receiving the focused incident RF wave.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

The invention claimed is:

1. A window assembly comprising:

a window; and an array of lens elements disposed on or in the window, wherein each lens element of the array of lens elements is optically transparent and electrically conductive, the array of lens elements being configured to impart a plurality of phase shifts to an incident radio-frequency (RF) wave received at the window, wherein the array of lens elements comprises a first subset of lens elements configured to impart a plurality of first phase shifts to the incident radio-frequency (RF) wave to produce a first altered wavefront of the incident RF wave and a second subset of lens elements configured to impart a plurality of second phase shifts to the first altered wavefront of the incident RF wave to produce a second altered wavefront of the incident RF wave.

2. The window assembly of claim 1, wherein respective phase shifts of the plurality of phase shifts correspond to respective sizes of lens elements components of the array of lens elements.

3. The window assembly of claim 1, wherein the window comprises a first layer and a second layer, and wherein the array of lens elements is disposed between the first layer and the second layer.

4. The window assembly of claim 3, further comprising a middle layer between the first layer and the second layer, the array of lens elements being disposed between the first layer and the middle layer.

5. The window assembly of claim 4, wherein the middle layer comprises polyvinyl butyral (PVB).

6. The window assembly of claim 4, further comprising a matching layer adjacent to the first layer and separated from the middle layer.

7. The window assembly of claim 1, wherein the array of lens elements is further configured to alter the incident RF wave from a spherical RF wave into a planar RF wave.

8. The window assembly of claim 1, wherein the array of lens elements is further configured to impart the plurality of phase shifts to a mmWave RF signal, and wherein the plurality of phase shifts spans a range of phase shifts of at least 90°.

9. The window assembly of claim 1, wherein the first subset of lens elements of the array of lens elements correspond to one phase shift of the plurality of phase shifts and are disposed concentrically with the second subset of lens elements of the array of lens elements corresponding to another respective phase shift of the plurality of phase shifts.

10. The window assembly of claim 1, wherein lens elements of the array of lens elements comprise conductive patches of different sizes corresponding to the plurality of phase shifts.

11. The window assembly of claim 10, wherein the lens elements of the array of lens elements comprise rectangular conductive patches.

12. The window assembly of claim 10, wherein the lens elements of the array of lens elements further comprise conductive rings surrounding respective conductive patches of the array of lens elements.

13. The window assembly of claim 1, wherein a component of each lens element of the array of lens elements is electrically isolated from adjacent lens elements of the array of lens elements.

14. A vehicle communication system comprising:

the window assembly of claim 1, wherein the window is a window of a vehicle; and an RF transfer device situated adjacent to the window assembly, the RF transfer device configured to produce the incident RF wave and to receive an outside RF wave originating outside the vehicle and having been focused by the window assembly.

15. The vehicle communication system of claim 14, wherein the RF transfer device comprises a plurality of RF transmitters, the vehicle communication system further comprising a scanning controller communicatively coupled to the plurality of RF transmitters and configured to activate the plurality of RF transmitters selectively to perform beam scanning.

16. The vehicle communication system of claim 14, wherein the RF transfer device is part of a user equipment (UE), the UE configured to report a strength of the outside RF wave, having been focused by the window assembly, as a function of position or orientation of the UE with respect to the window assembly.

17. A method of altering a wavefront, the method comprising:

receiving an incident radio-frequency (RF) wave at a window;

imparting, on or in the window, a plurality of first phase shifts to respective spatial portions of the incident RF wave to produce a first altered wavefront of the incident RF wave; and imparting, to the first altered wavefront of the incident RF wave, a plurality of second phase shifts to produce a second altered wavefront of the incident RF wave.

18. The method of claim 17, wherein imparting the plurality of phase shifts includes altering the incident RF wave from a spherical RF wave into a planar RF wave.

19. The method of claim 17, wherein imparting the plurality of phase shifts includes focusing the incident RF wave to produce a focused incident RF wave, the method further comprising receiving the focused incident RF wave.

20. The method of claim 19, further comprising:

receiving the focused, incident RF wave at a user equipment (UE); and reporting to a user a strength of the focused incident RF wave as a function of position or orientation of the UE with respect to the window.

21. A window assembly comprising:

a window;

means for imparting, on or in the window, a plurality of first phase shifts to respective spatial portions of an incident radio-frequency (RF) wave received at the window to produce a first altered wavefront of the incident RF wave; and means for imparting, to the first altered wavefront of the incident RF wave, a plurality of second phase shifts to produce a second altered wavefront of the incident RF wave.

22. The window assembly of claim 21, wherein the means for imparting the plurality of phase shifts include means for altering the incident RF wave from a spherical RF wave into a planar RF wave.

23. The window assembly of claim 21, wherein the means for imparting the plurality of phase shifts include means for focusing the incident RF wave to produce a focused incident RF wave, the window assembly further comprising means for receiving the focused incident RF wave.

* * * * *